(12) United States Patent
Swan

(10) Patent No.: US 6,830,012 B1
(45) Date of Patent: Dec. 14, 2004

(54) TRAINING COLLAR FOR ANIMALS

(76) Inventor: J. Robert Swan, 111 Colonial Heights, Sanger, TX (US) 76266

( * ) Notice: Subject to any disclaimer, the term of this patent is extended or adjusted under 35 U.S.C. 154(b) by 0 days.

(21) Appl. No.: 10/618,898

(22) Filed: Jul. 14, 2003

Related U.S. Application Data

(60) Provisional application No. 60/395,841, filed on Jul. 15, 2002.

(51) Int. Cl.[7] .............................................. A01K 15/02
(52) U.S. Cl. ...................................... 119/720; 119/721
(58) Field of Search ................................. 119/720, 721; 607/58, 72, 75; 600/537, 546; 128/848

(56) References Cited

U.S. PATENT DOCUMENTS

| | | | | |
|---|---|---|---|---|
| 631,733 A | * | 8/1899 | Bonfils et al. ............... | 607/149 |
| 3,480,010 A | * | 11/1969 | Crossley ...................... | 128/848 |
| 4,662,378 A | * | 5/1987 | Thomis ....................... | 600/382 |
| 4,715,367 A | * | 12/1987 | Crossley ...................... | 600/27 |
| 4,895,162 A | * | 1/1990 | Dolliver ...................... | 600/534 |
| 5,123,425 A | * | 6/1992 | Shannon et al. ............ | 128/848 |
| 5,265,624 A | * | 11/1993 | Bowman ..................... | 128/848 |

* cited by examiner

*Primary Examiner*—Michael J. Carone
*Assistant Examiner*—Bret Hayes
(74) *Attorney, Agent, or Firm*—Bracewell & Patterson, L.L.P.

(57) ABSTRACT

An animal collar has a band with an inner layer and an outer layer. A pair of screws extend through and protrude from the outer layer for securing to a control unit that supplies an electrical signal upon the occurrence of a selected event. A pair of conductive leads extends from the screws in opposite directions between the inner and outer layers. A threaded receptacle is located at the electrode end of each lead. An electrode extends through a hole in the inner layer and engages the threaded receptacle.

20 Claims, 2 Drawing Sheets

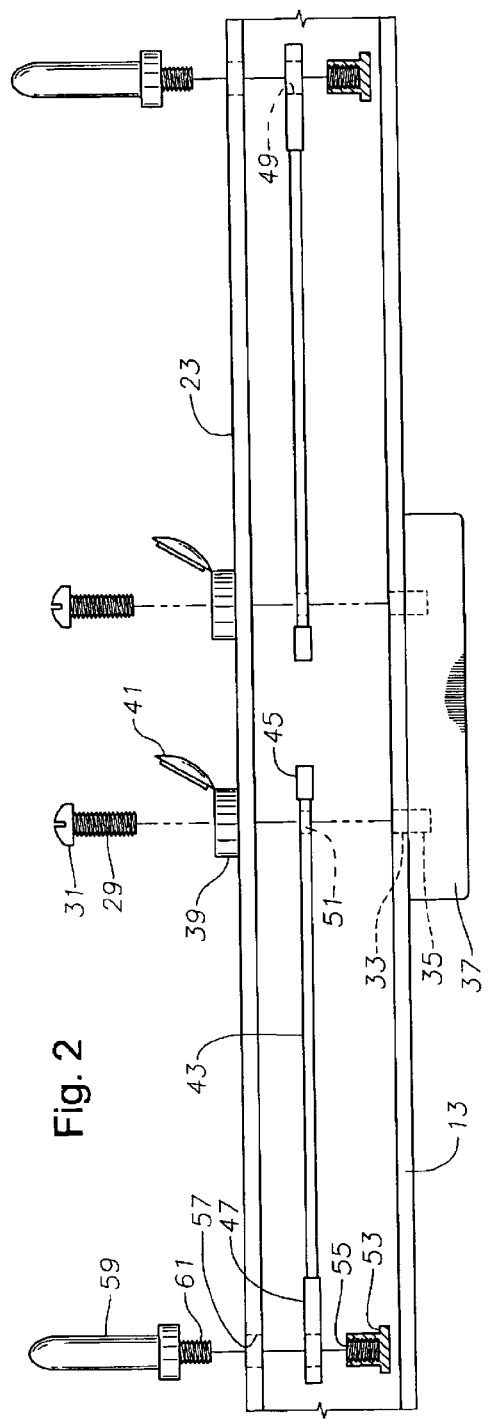
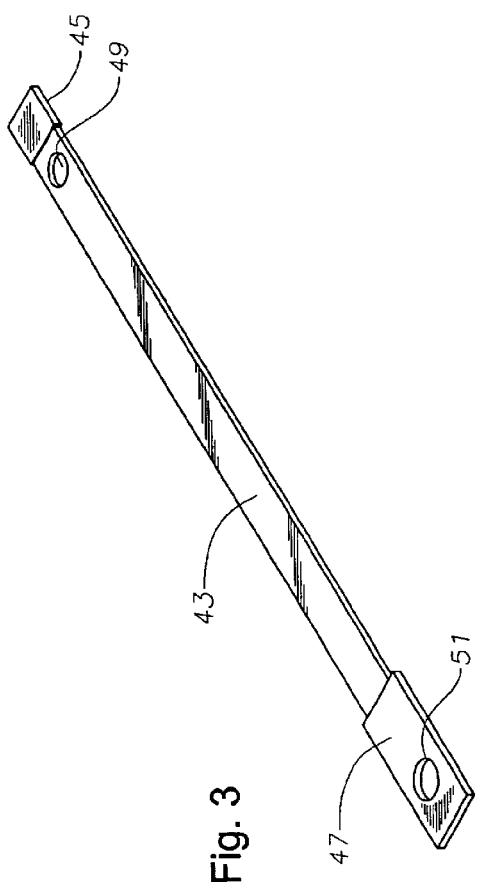

TRAINING COLLAR FOR ANIMALS

This application claims the provisional application filing date of Jul. 15, 2002, Ser. No. 60/395,841, entitled Universal Training Collar for Animals.

1. FIELD OF THE INVENTION

This invention relates in general to collars for pets, and particularly to a dog collar that has electrodes to provide a shock to the dog if the dog strays across an electromagnetic field.

2. BACKGROUND OF THE INVENTION

One method to prevent a dog from straying out of a designated area, such as a yard, uses buried or hidden electrical wires at the designated area boundaries. Circuitry coupled to the wires generates an electromagnetic field in the vicinity of each wire. The dog has a collar with a control unit that senses the electromagnetic field. Electrode pins extend from an inner side of the collar into contact with the neck of the dog. In the event the control unit senses the electromagnetic field, it provides a high frequency warning that is audible to the dog. Also, the control unit sends a voltage pulse to the electrodes to shock the dog, which normally is causes the dog to move away from the boundary. Collars with such electrodes are used with other types of control units, also. For example, one type of collar that provides an electrical shock when sensing barking of the dog. Collars in which a trainer can send an RF signal to a control unit on the collar to apply a shock are also known.

Normally, the electrode pins screw into the control unit, thus are located directly opposite the control unit. When the collar is worn, the control unit is normally in a lower position adjacent a throat area of the dog. Some dogs do not respond to the shocks with this type of collar. Sometimes the shocks are not at a high enough level because the electrode pins do not make good enough contact with the typically loose skin in the throat area.

Moving the electrode pins farther away from the control unit has been found to provide better control of certain dogs. When spaced from the control unit, the electrode pins engage sides of the neck where the skin is not usually as loose. The prior art types with the widely spaced electrodes use wires that extend externally along the collar from the control unit to the electrodes. These prior art types were subject to failure due to the wires coming loose.

3. SUMMARY OF THE INVENTION

In this invention, an animal collar is provided that has receptacles for widely spaced electrodes. The collar comprises a flexible band having two ends. A fastener is on at least one of the ends for fastening to the other end to secure the band around a neck of an animal. At least a portion of the band has an inner layer for contact with the neck of the animal and an outer layer on the opposite side.

A pair of electrical terminals are mounted to the band. The terminals extend through holes in the outer layer for connecting to a control unit. The control unit supplies an electrical signal upon the occurrence of a selected event, such as entering an electromagnetic field. At least one electrically conductive lead, and preferably two, has a terminal end in electrical engagement with one of the electrical terminals. The leads extend between the inner and outer layers, each terminating in an electrode end spaced from the control unit.

A receptacle is in electrical contact with the electrode end of each of the leads. The receptacle is accessible through a hole in the inner layer for selectively receiving an electrode. The electrodes apply an electrical shock to the neck of the animal upon receipt of a voltage pulse from the control unit.

4. BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 2 is an exploded view of a portion of the collar of FIG. 1.

FIG. 3 is a perspective view of one of the electrode leads of the collar of FIG. 1.

5. DETAILED DESCRIPTION OF THE INVENTION

Figure 1:
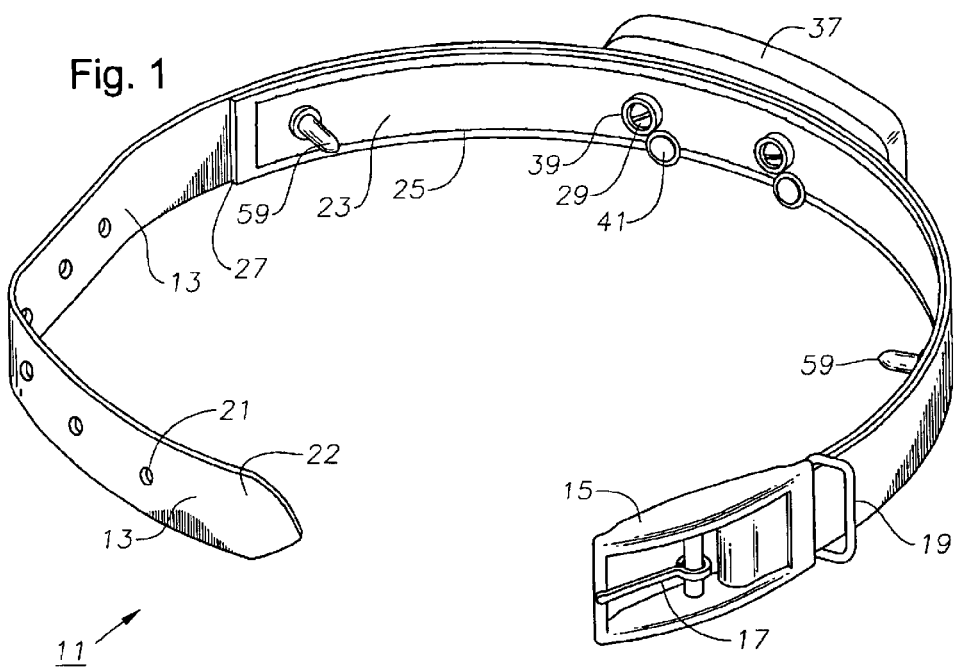
FIG. 1 is a perspective view of a collar constructed according to the invention.
Figure 4:
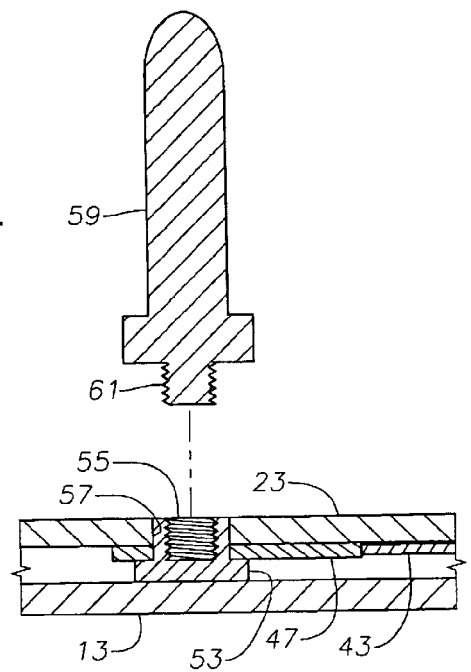
FIG. 4 is a partial sectional view of the collar of FIG. 1, showing an electrode end of one of the electrode straps and one of the electrodes in exploded form.

Referring to FIG. 1, collar 11 is typically used to train dogs to not cross a designated border, though collar 11 may also be used with other animals and for other purposes. Collar 11 comprises a flexible band of leather, plastic or a woven fabric for placement around a dog's neck. Collar 11 has an outer layer 13 that extends the full length of the band of collar 11. Outer layer 13 has a buckle 15 secured conventionally to one end by looping outer layer 13 over a portion of buckle 15. Buckle 15 has a pivotal tongue 17 and may also have a ring 19 for attachment of a leash and identification tags. Tongue 15 inserts into one of a plurality of attachment holes 21 formed in the opposite end 22 of outer layer 13. Other types of fasteners to secure the ends of collar 11 are suitable, including fasteners that have components on each end that snap together.

An inner layer 23 is secured to outer layer 13, preferably by stitching 25. Inner layer 23 has the same width as outer layer 13 in the preferred embodiment. Although inner layer 23 could has the same length as outer layer 13, preferably it is shorter. Inner layer 23 has one end 27 that is spaced a considerable distance from end 22 of outer layer 13. The opposite end of inner layer 23 in this embodiment terminates at ring 19. Stitching 25 defines a closed pocket between inner layer 23 and outer layer 13.

A pair of terminals 29, which are screws in this embodiment, are shown in FIG. 2. Screws 29 are fairly closely spaced to each other and located closer to buckle 15 in this embodiment than to buckle attachment end 22. However, the positioning of screws 29 along the length of collar 11 is not critical. Each screw 29 is of conductive metal and has a head 31 that locates on the exterior side of inner layer 23. Each screw 29 extends through a hole in inner layer 23 and a hole 33 in outer layer 13. Each screw 29 is adapted to a screw into a receptacle 35 located in a control unit 37. Control unit 37 is a conventional member for providing an electrical pulse upon the occurrence of a selected event, such as entering the proximity of a certain type of electromagnetic field. Control unit 37 thus senses the electromagnetic field and provides a response.

Screw heads 31 are enclosed by insulators 39 on the inner side of inner layer 23. Insulators 39 preferably have removable caps 31 that provide access to screw heads 31. When cap 41 is closed, insulators 39 shield screw heads 31 from contact with the animal wearing collar 11.

A pair of conductive leads 43 are located in the pocket between outer layer 13 and inner layer 23. Conductive leads 43 are rectangular strips extending parallel to the length of collar 11. Conductive leads 43 may be of any flexible conductive material, such as wire or metallic strips, but are preferably formed of wire that is woven into a flat configuration. A terminal end retainer 45 is optionally located on the terminal end of each lead 43. Terminal end retainer 45 is a plastic sleeve that inserts over the end to prevent unraveling of the weave. Terminal end retainer 45 is optional, however, and may be removed once lead 43 is inserted into the pocket between inner and outer layers 23, 13.

An electrode end fitting 47 fits over the electrode end of each lead 43. In the preferred embodiment, electrode end fitting 47 is a flattened copper tube that has been crimped or flattened over the end of lead 43. A terminal end hole 49 is formed through lead 43 next to terminal end retainer 45. Since the preferred embodiment utilizes a wire weave, terminal end hole 49 is formed simply by deforming the woven wires into a circular hole. Screws 29 pass through terminal end holes 49 and make electrical contact with leads 43 while doing so.

An electrode end hole 51 is formed in electrode end fitting 47. A receptacle 53 of conductive metal extends through hole 51, making electrical contact with electrode end fitting 47 while doing so. Receptacle 53 resembles a threaded rivet, having a head with a flange in contact with outer layer 13 and a cylindrical shank with internal threads 55. The cylindrical shank extends through hole 51 and into a hole 57 formed in inner layer 23. The length of receptacle 53 is selected so that its inner end is flush or slightly recessed from the exterior side of inner layer 23.

A conventional electrode pin 59 having a threaded shank 61 is adapted to extend into hole 57 and secure to threads 55. Pin 59 protrudes inward for engaging the neck of an animal. The lengths of leads 43 are selected to place terminals 59 on opposite sides of the neck of the animal. Depending upon the diameter of collar 11, once buckle 15 is secured, the electrode pins could be as much as 180° apart from each other. The diameter of collar 11 depends upon the particular buckle attachment hole 21 that is engaged by buckle 15. The lengths of leads 43 need not be the same. Normally, each lead 43 is considerably longer than the spacing between terminal screws 29.

In use, while in the wide spacing mode, terminal screws 29 will attach control unit 37 to collar 11. Electrode pins 59 will secure to receptacles 53. Caps 41 of insulators 39 will be closed. Collar 11 is worn by the dog conventionally. Generally, the control unit 37 will slide to the lower side because of its weight. This places electrode pins 59 in contact with the sides of the dog's neck.

In one use for collar 11, the pet owner will have a designated area with either buried or concealed wires connected to a control box. A central control circuit box (not shown) provides a signal to the wires that generates an electromagnetic field in the vicinity of the wires. If the dog becomes too close to one of the wires, the electromagnetic field will be sensed by the control unit 37. Typically, control unit 37 will provide a high frequency sound signal that is heard by the dog, thus warning the dog away from the boundary. Also, control unit 37 delivers a direct current voltage pulse from its receptacles 35 to screws 29. The electrical charge flows through leads 43 to electrode pins 59 and to the dog. One electrode pin 59 will be positive while the other negative. Optionally, the pet owner may rely only on the audible warning and place insulators over electrode pins 59 to prevent shocking the dog. This latter procedure might be done particularly after the dogs are trained to recognize the audible warning and not cross the boundary.

In the event that the pet owner wishes to use a close spacing, he can do so by inserting electrode pins 59 into control unit receptacles 35 rather than screws 29. The threaded shanks 61 thus serve as terminals and hold control unit 37 to outer layer 13. Threaded shanks 61 also transmit voltage pulses from control unit 37 directly to pins 59. In this configuration, leads 43 perform no function since there are no electrode pins 59 attached to receptacles 53. Similarly, if one wishes to use one electrode pin 59 secured to one lead threaded receptacle 53 and another electrode pin 59 secured to control unit threaded receptacle 35, he could do so. In that case, the spacing between electrode pins 59 would be closer than the wide spacing and the second lead 43 would not perform a function. Although not preferable, the second lead 43 could thus be omitted.

The invention has significant advantages. The internally located leads provide a wide spacing for the electrodes where such is needed. The inner and outer layers provide protection against damage to the leads and the contacts.

While the invention has been shown in only one of its forms, it should be apparent to those skilled in the art that is not so limited but it is susceptible to various changes without departing from the scope of the invention. For example if the collar is to be used only in a wide-spaced mode, the electrodes could be permanently joined to the electrode ends of the leads.

I claim:

1. An animal collar, comprising:

a flexible band having two ends;

a fastener on at least one of the ends for fastening to the other end to secure the band circumferentially around a neck of an animal;

at least a portion of the band having an inner layer for contact with the neck of the animal and an outer layer;

a pair of electrical terminals mounted to the band, the terminals being accessible through holes in the outer layer for receiving a control unit that supplies an electrical signal upon an occurrence of a selected event;

at least one electrically conductive lead having a terminal end in electrical engagement with one of the electrical terminals, the lead extending between the inner and outer layers and terminating in an electrode end that is spaced along the band circumferentially from said one of the electrical terminals; and a receptacle in electrical contact with the electrode end of the lead, the receptacle being accessible through a hole in the inner layer for selectively receiving an electrode to apply an electrical shock to the neck of the animal upon receipt of voltage from the control unit.

2. The collar according to claim 1, further comprising:

an electrical conductive second lead having a terminal end in electrical engagement with the other of the electrical terminals, the second lead extending between the inner and outer layers and terminating in a second electrode end that is spaced circumferentially from said other of the electrical terminals; and a second receptacle in electrical contact with the second electrode end of the second lead, the second receptacle being accessible through a second hole in the inner layer for selectively receiving the second electrode to apply an electrical shock to the neck of the animal upon receipt of voltage from the control unit.

3. The collar according to claim 1, wherein the lead comprises a flat strip of conductive material.

4. The collar according to claim 1, wherein the receptacle comprises an internally threaded socket.

5. The collar according to claim 1, wherein each of the terminals comprises an externally threaded member that protrudes from the outer layer.

6. The collar according to claim 1, wherein the lead comprises:
- a flat strap of woven conductive wire; and
- a flat fitting of conductive metal located on the electrode end, the fitting having a hole through which the receptacle extends.

7. The collar according to claim 1, wherein the inner and outer layers are stitched together at opposite edges of the band, defining a pocket that receives the lead.

8. The collar according to claim 1, wherein the inner layer has a shorter length than the outer layer.

9. An animal collar, comprising:
- a flexible band having two ends;
- a fastener on at least one of the ends for fastening to the other end to secure the band circumferentially around a neck of an animal;
- at least a portion of the band having an inner layer for contact with the neck of the animal and an outer layer;
- a pair of terminals extending through and protruding from the outer layer for securing to a control unit that supplies an electrical signal upon an occurrence of a selected event;
- a pair of electrically conductive leads, each having a terminal end in electrical engagement with one of the terminals, the leads extending in opposite directions from the terminals parallel to a length of the band and between the inner and outer layers, each of the leads having an electrode end on an end opposite the terminal end; and
- a pair of electrodes, each of the electrodes being in electrical engagement with one of the electrode ends of one of the leads and protruding from an exterior side of the inner layer for contact with the neck of the animal, wherein the electrodes are positioned circumferentially along the band from the control unit.

10. The collar according to claim 9, wherein each of the electrode ends comprises a threaded receptacle in electrical contact with one of the leads, each of the receptacles extending from one of the leads into a hole in the inner layer for receiving a threaded end of one of the electrodes.

11. The collar according to claim 9, wherein each of the leads comprises a flat strip of conductive material.

12. The collar according to claim 9, wherein each of the leads comprises:
- a flat strap of woven conductive wire; and
- a flat fitting of conductive metal located on the electrode end, the fitting having a hole through which one of the receptacles extends.

13. The collar according to claim 9, wherein the inner and outer layers are stitched together at opposite edges of the band, defining a pocket that receives the leads.

14. The collar according to claim 9, wherein the inner layer has a shorter length than the outer layer.

15. The collar according to claim 9, wherein each of the terminals comprises a screw having a head on an exterior side of the inner layer and extending through a hole in the inner layer.

16. The collar according to claim 15, further comprising an electrical insulator enclosing the head of each of the screws.

17. An animal collar, comprising:
- a flexible band having two ends;
- a fastener on at least one of the ends for fastening to the other end to secure the band circumferentially around a neck of an animal;
- at least a portion of the band having an inner layer for contact with the neck of the animal and an outer layer;
- a pair of screws extending through the inner and outer layers and protruding from outer layer;
- a control unit secured to the screws on an exterior side of the outer layer for supplying an electrical signal upon an occurrence of a selected event;
- a pair of electrically conductive leads, each having a terminal end in electrical engagement with one of the screws, the leads extending in opposite directions from the screws parallel to a length of the band and between the inner and outer layers, each of the leads having an electrode end opposite the terminal end;
- a pair of threaded receptacles, each of the receptacles being in electrical contact with the electrode end of one of the leads, each of the receptacles extending from the electrode end into a hole in the inner layer; and
- a pair of electrode pins, each of the pins having a threaded end that screws into one of the threaded receptacle for applying an electrical shock to the neck of the animal upon receipt of voltage from the control unit, wherein the electrode pins are positioned circumferentially from the control unit.

18. The collar according to claim 17, wherein the inner and outer layers are stitched together at opposite edges of the band, defining a pocket that receives the leads.

19. The collar according to claim 17, wherein:
- the fastener comprises a buckle attached to the outer layer at one end of the band and a plurality of buckle attachment holes extending through the outer layer at the other end of the band; and
- the inner layer has a first end spaced from the buckle and a second end spaced from the buckle attachment holes.

20. The collar according to claim 17, wherein each of the screws has a head on an exterior side of the inner layer and extends through a hole in the inner layer, and wherein the collar further comprises an electrical insulator enclosing the head of each of the screws.

* * * * *